(12) United States Patent
Lombard et al.

(10) Patent No.: US 8,534,994 B2
(45) Date of Patent: Sep. 17, 2013

(54) TURBOCHARGER WITH DIVIDED TURBINE HOUSING AND ANNULAR ROTARY BYPASS VALVE FOR THE TURBINE

(75) Inventors: Alain Lombard, Vosges (FR); Nicolas Serres, Vosges (FR); Mani Palaniyappan, Zline (CZ); Aitor Herrera Celaya, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 438 days.

(21) Appl. No.: 12/966,343

(22) Filed: Dec. 13, 2010

(65) Prior Publication Data

US 2012/0148386 A1    Jun. 14, 2012

(51) Int. Cl.
*F02B 37/18* (2006.01)

(52) U.S. Cl.
USPC .............................. 415/145; 60/602

(58) Field of Classification Search
USPC ............... 60/600, 602; 415/61, 144, 145, 415/151, 157–159, 166, 167, 191
See application file for complete search history.

(56) References Cited

U.S. PATENT DOCUMENTS

| | | | | |
|---|---|---|---|---|
| 5,046,317 A * | 9/1991 | Satokawa | ......................... | 60/602 |
| 5,146,752 A * | 9/1992 | Bruestle | ......................... | 60/602 |
| 5,579,643 A | 12/1996 | McEwen et al. | | |
| 6,672,061 B2 * | 1/2004 | Schmid et al. | ............... | 60/605.2 |
| 7,047,739 B2 * | 5/2006 | Fledersbacher et al. | ........ | 60/602 |
| 8,336,309 B2 * | 12/2012 | McEwan et al. | ................ | 60/602 |

| | | |
|---|---|---|
| 2003/0029168 A1 | 2/2003 | Hercey et al. |
| 2005/0091976 A1 | 5/2005 | Whiting |
| 2007/0122267 A1 | 5/2007 | Lombard et al. |
| 2007/0169479 A1 | 7/2007 | Nicolle et al. |
| 2009/0183506 A1 | 7/2009 | Trombetta et al. |
| 2009/0224190 A1 | 9/2009 | Dale et al. |

FOREIGN PATENT DOCUMENTS

| | | | |
|---|---|---|---|
| DE | 42 42 494 C1 | 9/1993 | |
| DE | 4242494 C1 * | 9/1993 | ..................... 415/151 |
| DE | 102 12 675 A1 | 10/2003 | |
| WO | WO 03/080999 A1 | 10/2003 | |

OTHER PUBLICATIONS

International Preliminary Examination Report for PCT/IB 03/05142 dated Nov. 17, 2005.

* cited by examiner

*Primary Examiner* — Nathaniel Wiehe
*Assistant Examiner* — Woody A Lee, Jr.
(74) *Attorney, Agent, or Firm* — Alston & Bird LLP

(57) ABSTRACT

A turbocharger includes a turbine wheel mounted within a turbine housing and connected to a compressor wheel by a shaft. The turbine housing defines an exhaust gas inlet connected to a divided volute that surrounds the turbine wheel, and an axial bore through which exhaust gas that has passed through the turbine wheel is discharged from the turbine housing. The turbine housing further defines a pair of concentric annular bypass passages surrounding the bore and arranged to allow exhaust gas to bypass the turbine wheel as two separate bypass streams. An annular bypass valve is disposed in the bypass passage. The bypass valve comprises a fixed annular valve seat and a rotary annular valve member arranged coaxially with the valve seat. The valve member is disposed against the valve seat and is rotatable about the axis for selectively varying a degree of alignment between respective orifices in the valve seat and valve member.

10 Claims, 17 Drawing Sheets

TURBOCHARGER WITH DIVIDED TURBINE HOUSING AND ANNULAR ROTARY BYPASS VALVE FOR THE TURBINE

CROSS-REFERENCE TO RELATED APPLICATION

This application is related to U.S. patent application Ser. No. 12/611,816 filed on Nov. 3, 2009, and U.S. patent application Ser. No. 12/711,434 filed on Apr. 30, 2010, the entire contents of both said applications being hereby incorporated herein by reference.

BACKGROUND OF THE INVENTION

The present disclosure relates to exhaust gas-driven turbochargers having a divided turbine housing for two separate exhaust gas streams fed to the turbine. The present disclosure relates more particularly to bypass arrangements that allow exhaust gas to bypass the turbine under certain engine operating conditions.

In a conventional turbocharger, the turbine housing defines a bypass conduit located generally to one side of the main bore through the housing, and the bypass conduit is connected to the exhaust gas inlet or the volute of the housing via a bypass valve. The bypass valve typically is a swing or poppet style valve comprising a circular valve member that is urged against a flat valve seat surrounding the bypass passage opening. The valve usually is arranged such that the exhaust gas pressure acts on the valve member in a direction tending to open the valve. One drawback associated with such an arrangement is that it is difficult to completely seal the valve in the closed position, since gas pressure tends to open the valve. Leakage past the closed bypass valve is a cause of performance degradation of the turbine and, hence, the turbocharger and its associated engine. The typical solution to the leakage issue is to preload the bypass valve member against the valve seat, but often this does not fully eliminate leakage, and in any event it causes additional problems such as an increase in the required actuation force for opening the valve.

Furthermore, swing or poppet valves tend to be poor in terms of controllability, especially at the crack-open point, and it is common for the bypass flow rate to be highly non-linear with valve position, which makes it very difficult to properly regulate the bypass flow rate. This leads to problems such as poor transient response of the turbocharger and engine system.

The aforementioned application Ser. Nos. 12/611,816 and 12/711,434 describe previous developments by the assignee of the present application, directed to improved bypass valve arrangements in turbocharger turbine components. The present application represents a still further development adapted particularly to turbochargers with divided turbine housing/volute configurations.

BRIEF SUMMARY OF THE DISCLOSURE

The present disclosure describes various embodiments of turbochargers with divided turbine housings and having a novel bypass arrangement that seeks to address issues such as the ones noted above. In one embodiment, a turbocharger comprises a compressor wheel mounted within a compressor housing, and a turbine wheel mounted within a turbine housing and connected to the compressor wheel by a shaft. The turbine housing defines an exhaust gas inlet connected to a volute that surrounds the turbine wheel. The volute is a divided volute that defines two (i.e., first and second) separate spaces that respectively receive two separate streams of exhaust gas from an internal combustion engine. The turbine housing further defines an axial bore through which exhaust gas that has passed through the turbine wheel is discharged from the turbine housing.

The turbine housing additionally defines a pair of (i.e., first and second, or outer and inner) concentric annular bypass passages surrounding the bore and arranged to allow exhaust gas within each of the first and second separate spaces of the divided volute to bypass the turbine wheel as separate bypass streams. The first or outer bypass passage is radially outward of and concentrically surrounds the second or inner bypass passage. An annular bypass valve is disposed in communication with the bypass passages. The bypass valve comprises a fixed valve seat of annular form and a rotary valve member of annular form arranged coaxially with the valve seat relative to an axis. The valve member is disposed against the valve seat and is rotatable about the axis for selectively varying a degree of alignment between respective orifices in the valve seat and valve member, ranging from no alignment defining a closed condition of the bypass valve, to at least partial alignment defining an open condition of the bypass valve.

An advantage of this bypass arrangement is that exhaust gas pressure acts on the valve in a direction tending to improve, rather than hinder, sealing, in contrast to the aforementioned swing and poppet style bypass valve arrangements.

A further advantage is that the valve can achieve better controllability than is typically possible with swing or poppet valves, particularly at the crack-open point.

In a particular embodiment, the valve member defines a plurality of first or outer valve member orifices and a plurality of second or inner valve member orifices. The outer valve member orifices are circumferentially spaced apart about the axis and located at a relatively greater radial distance from the axis, while the inner valve member orifices are circumferentially spaced apart about the axis and located at a relatively smaller radial distance from the axis. That is, the outer valve member orifices are arranged in a ring that is radially outward of and concentrically surrounds the ring of the inner valve member orifices. Correspondingly, the valve seat defines a plurality of outer valve seat orifices and a plurality of inner valve seat orifices. The outer and inner valve seat orifices are arranged in concentric rings substantially as for the orifices of the valve member, so that the outer valve member orifices and the outer valve seat orifices lie at substantially the same radial distance from the axis, and the inner valve member orifices and the inner valve seat orifices lie at substantially the same radial distance (smaller than that of the outer orifices) from the axis.

The valve member in one embodiment is a generally flat annular disk and the outer and inner valve member orifices are circumferentially spaced apart about a circumference of the valve member. Similarly, the valve seat is a generally flat annular disk having the outer and inner valve seat orifices circumferentially spaced apart in correspondence with the outer and inner valve member orifices, respectively. There is sufficient circumferential distance between adjacent valve seat orifices to accommodate the respective valve member orifices therebetween in the closed condition of the bypass valve. In other words, in the closed condition there is no overlap between the valve member orifices and the corresponding valve seat orifices.

The valve can include features facilitating sealing between the valve member and valve seat. In one embodiment, either the valve member or the valve seat includes raised pads surrounding the respective orifices therein, and the pads are in contact with a substantially planar surface of the other of the valve member and the valve seat so as to provide sealing between the valve member and the valve seat. The valve seat can also include a ring-shaped raised ridge or pad located at a radius intermediate the outer valve seat orifices and the inner valve seat orifices for sealing against a surface of the valve member in order to minimize or eliminate leakage flow between the outer and inner bypass passages. Alternatively, the ring-shaped ridge or pad can be provided on the valve member for sealing against a surface of the valve seat.

The orifices can have various shapes, including circular or non-circular. The orifices can be circumferentially spaced uniformly or non-uniformly.

The turbocharger also includes a drive system for effecting the needed rotational movement of the valve member. In one embodiment, the drive system includes a rotary drive member penetrating through the turbine housing in a direction generally transverse to the axis about which the valve member rotates, and a drive arm attached to a distal end of the rotary drive member. A distal end of the drive arm engages the valve member such that rotation of the rotary drive member causes the drive arm to rotate the valve member about the axis. The drive system can further comprise a link attached to a proximal end of the rotary drive member, and a linear actuator having an actuator rod, the actuator being operable to extend and retract the actuator rod. A distal end of the actuator rod is connected to the link such that extension of the actuator rod causes the link to rotate the rotary drive member in one direction and retraction of the actuator rod causes the link to rotate the rotary drive member in the opposite direction.

If desired or necessary in a particular application, surfaces of components that relatively slide over one another can be coated with a friction/wear coating that reduces wear of the surfaces. For example, the raised pads and the surface they contact can be coated. The wear coating can be formed of various materials, including an aluminum diffusion coating, a nickel boron coating, or a ceramic coating (e.g., silicon nitride). In order to avoid material transfer from one surface to the abutting surface, preferably the two surfaces are coated with different materials.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
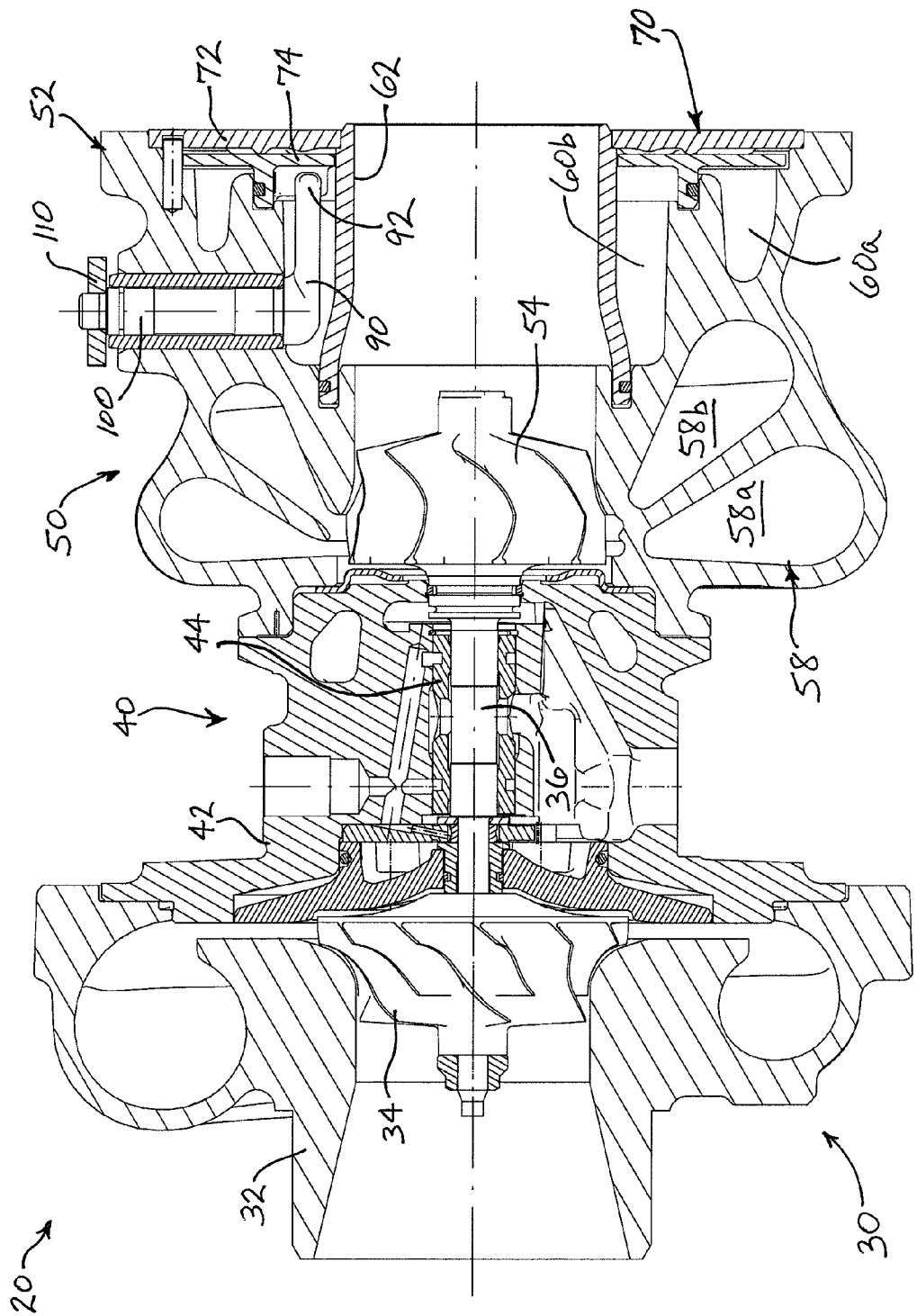
FIG. 1 is an axial cross-sectional view of a turbocharger in accordance with one embodiment of the present invention.
Figure 2:
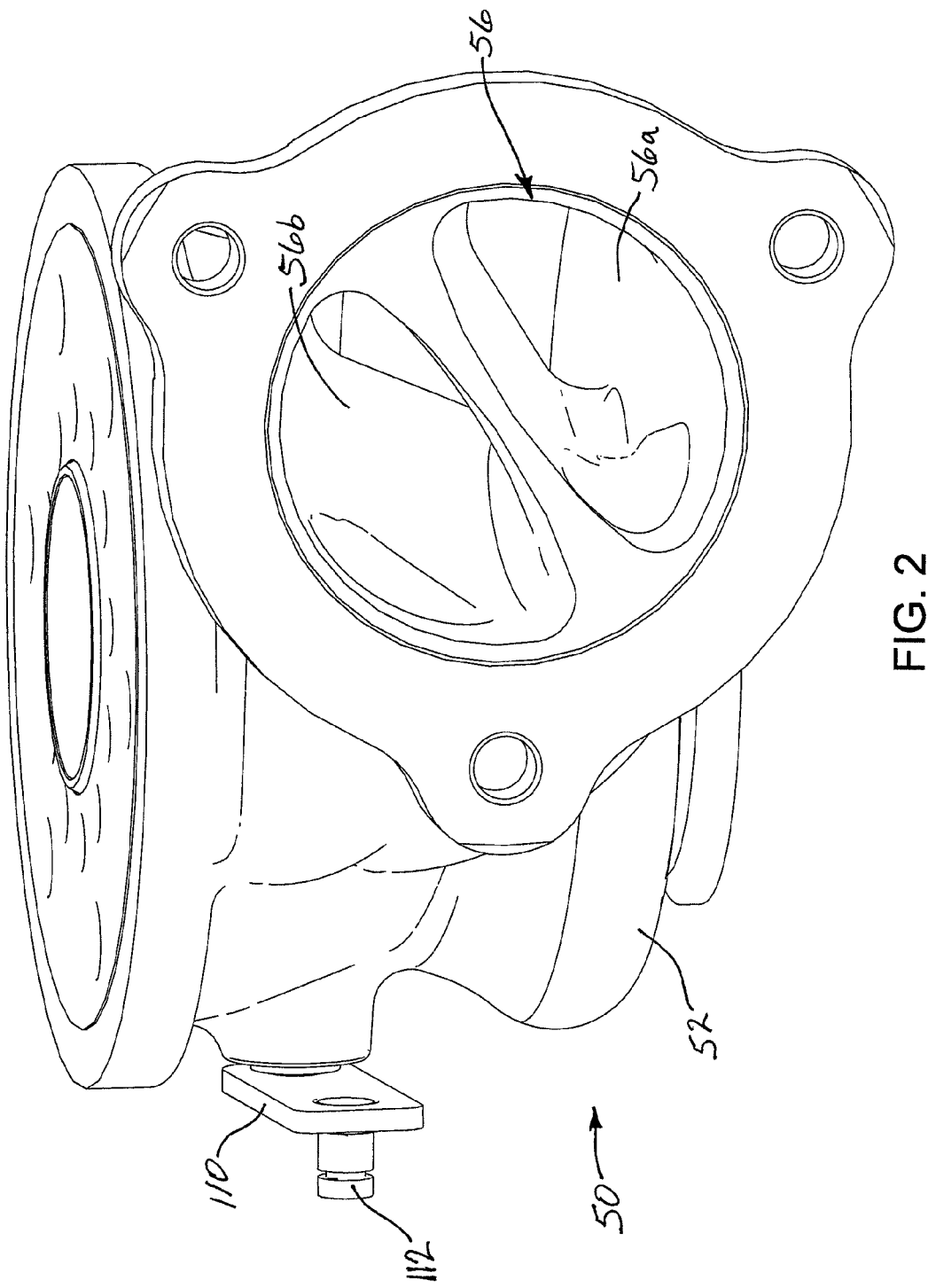
FIG. 2 is a side view of the turbine assembly for the turbocharger of FIG. 1.
Figure 3:
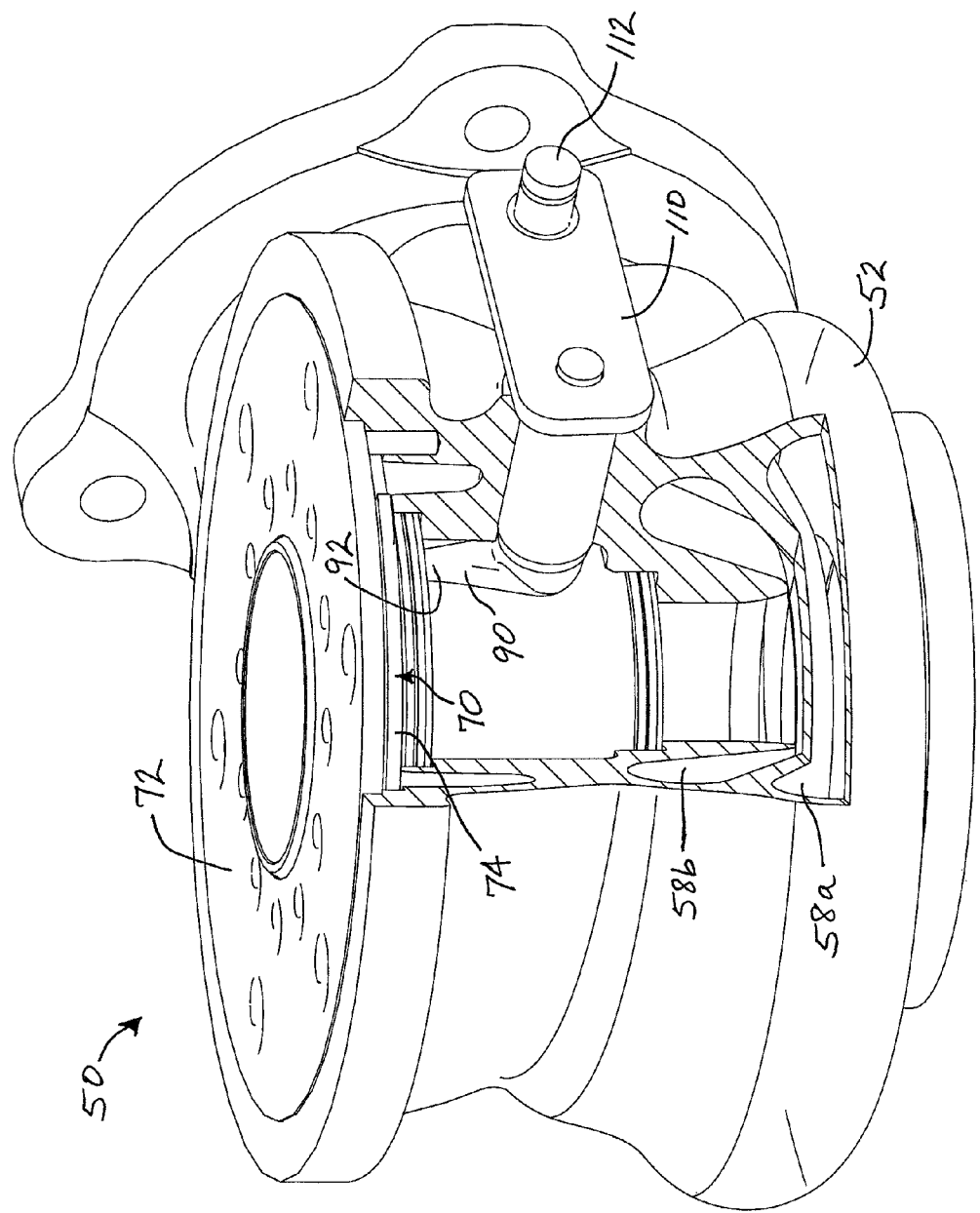
FIG. 3 is a perspective view of the turbine assembly of FIG. 2, wherein the turbine housing is shown partly cut away to reveal internal details.

A turbocharger 20 in accordance with one embodiment of the present invention is shown in axial cross-sectional view in FIG. 1, and various views of a turbine assembly for the turbocharger and components of the turbine assembly are depicted in FIGS. 2-13. As shown in FIG. 1, major sub-assemblies of the turbocharger 20 include a compressor assembly 30, a center housing assembly 40, and a turbine assembly 50. The compressor assembly 30 includes a compressor housing 32 and a compressor wheel 34 mounted therein and attached to one end of a rotary shaft 36. The center housing assembly 40 includes a center housing 42 that is affixed to the compressor housing 32 and that contains bearings 44 for the rotary shaft 36. The turbine assembly 50 includes a turbine housing 52 and a turbine wheel 54 mounted therein and attached to the opposite end of the rotary shaft 36.

The turbine housing 52 defines an exhaust gas inlet 56 through which exhaust gas from an internal combustion engine is received, and a merdionally divided volute 58 that receives the exhaust gas from the inlet 56 and distributes the gas around the 360° volute for feeding into the turbine wheel 54. In particular, the merdionally divided volute 58 defines a first volute 58a and a separate second volute 58b each of which extends 360° about the longitudinal axis of the turbine. The volutes 58a and 58b respectively receive two separate streams of exhaust gas from the engine (e.g., one stream from one sub-group of engine cylinders and the other stream from another sub-group of engine cylinders). Correspondingly, the exhaust gas inlet 56 is a divided inlet that defines two separate inlets 56a and 56b that are connected respectively to the two volutes 58a and 58b.

The two gas inlets 56a and 56b are also open to two separate generally annular bypass passages 60a and 60b defined in the turbine housing 52. The bypass passages 60a and 60b are concentrically arranged (outer passage 60a being radially outward of inner passage 60b) and both surround an axial bore 62 defined in the turbine housing. Exhaust gas that has passed through the turbine wheel 54 is exhausted from the turbine housing through the bore 62. The bypass passages 60a and 60b provide an alternative pathway for exhaust gas to flow without first having to pass through the turbine wheel 54.

An annular bypass valve 70 is installed in the bypass passage 60 for regulating flow through the bypass passage. The bypass valve 70 is a divided bypass valve that preserves the separation of the two exhaust gas streams in the two bypass passages 60a and 60b. With primary reference to FIGS. 3-9, the major components of the annular bypass valve 70 include a stationary valve seat 72 and a rotary valve member 74 in abutting engagement with the valve seat. The valve seat 72 and valve member 74 are arranged between an annular outer portion 52a of the turbine housing 52 and an annular inner member 52b. As shown, the inner member 52b is formed separately from the turbine housing 52 and is connected with an integral portion of the turbine housing, but in other embodiments the inner member can be an integral part of the turbine housing. The outer portion 52a and inner member 52b together define an annular space for receiving the valve member 74 and the valve seat 72. The valve member 74 is prevented from moving axially upstream by a shoulder defined by the outer portion 52a of the turbine housing, although during operation pressure of the exhaust gas urges the valve member 74 in the downstream direction. The valve member 74 is not constrained by the turbine housing but is free to rotate about its axis and to move axially against the valve seat 72. The valve seat 72 is prevented from moving axially, radially, or rotationally. A radially outer edge portion of the upstream face of the valve seat 72 (i.e., the left-hand face in FIG. 5) abuts a shoulder defined by the outer portion 52a of the turbine housing, and the radially inner edge portion of the upstream face abuts a shoulder defined by the inner member 52b, thereby putting the valve seat in a precise axial location as dictated by these shoulders.

The valve seat 72 (best illustrated in FIGS. 7 and 8) is a generally flat ring-shaped or annular member having a plurality of orifices 73a and 73b circumferentially spaced apart about a circumference of the valve seat, the orifices extending generally axially between the upstream and downstream faces of the valve seat. The orifices 73a are located at a relatively larger radius from the center of the valve seat 72, and the orifices 73b are at a relatively smaller radius from the center of the valve seat. The orifices 73a in the illustrated embodiment are uniformly spaced about the circumference of the valve seat, and likewise the orifices 73b are uniformly spaced (but with a different spacing from that of the orifices 73a), but as further described below, non-uniform spacing of the orifices is also possible and can be advantageous in some circumstances.

The rotary valve member 74 (best illustrated in FIG. 9) is a generally flat ring-shaped or annular member having a plurality of orifices 75a and 75b circumferentially spaced apart about a circumference of the valve seat, the orifices extending generally axially between the upstream and downstream faces of the valve member. The orifices 75a are located at a relatively larger radius from the center of the valve member 74, and the orifices 75b are at a relatively smaller radius from the center of the valve member. The orifices 75a in the illustrated embodiment are uniformly spaced about the circumference of the valve member, and the number and spacing of the orifices 75a in the valve member are the same as the number and spacing of the orifices 73a in the valve seat. However, as further described below, non-uniform spacing of the orifices 75a is also possible and can be advantageous in some circumstances; furthermore, the spacings of the orifices 73a and 75a do not have to be the same, and in some cases it can be advantageous for the spacings to be different. Similarly, the orifices 75b in the illustrated embodiment are uniformly spaced about the circumference of the valve member, and the number and spacing of the orifices 75b in the valve member are the same as the number and spacing of the orifices 73b in the valve seat. The valve member 74 has a substantially circular cylindrical outer edge 76 and a substantially circular cylindrical inner edge 78, the outer and inner edges 76, 78 being coaxial with respect to a central longitudinal axis of the valve member, which axis is also substantially coincident with a central longitudinal axis of the valve seat 72. The outer portion 52a of the turbine housing and the inner member 52b both define substantially circular bearing surfaces for the outer and inner edges 76, 78 of the rotary valve member 74 and there are clearances therebetween, so that the valve member can be rotated in one direction or the opposite direction about its central longitudinal axis in order to vary a degree of alignment between the valve member orifices 75 and the valve seat orifices 73, as further described below.

The valve member 74 further defines a fork or yoke comprising a pair of projections 80 that project axially from the upstream face of the valve member. The projections 80 are circumferentially spaced apart by a small distance sufficient to accommodate the distal end 92 of an L-shaped drive arm 90 that is rigidly affixed to a distal (radially inner) end of a rotary drive member 100. The rotary drive member 100 penetrates substantially radially through the turbine housing 52 via a bore 53 (see FIGS. 5 and 6) that connects with the generally annular bypass passage 60. The proximal (radially outer) end of the rotary drive member 100 is located outside the turbine housing 52 and is rigidly affixed to a link 110. The link 110 has a connecting member 112 (FIGS. 2 and 3) that is offset from the rotation axis of the rotary drive member 100 and that can be coupled to an actuator rod of an actuator (not shown) such that extension of the actuator rod causes the link 110 to rotate the rotary drive member 100 in one direction and retraction of the actuator rod causes the link to rotate the rotary drive member in the opposite direction. As a result, the drive arm 90 affixed to the distal end of the rotary drive member 100 in turn causes the valve member 74 to be rotated in one direction or the opposite direction about its axis.

Figure 4:
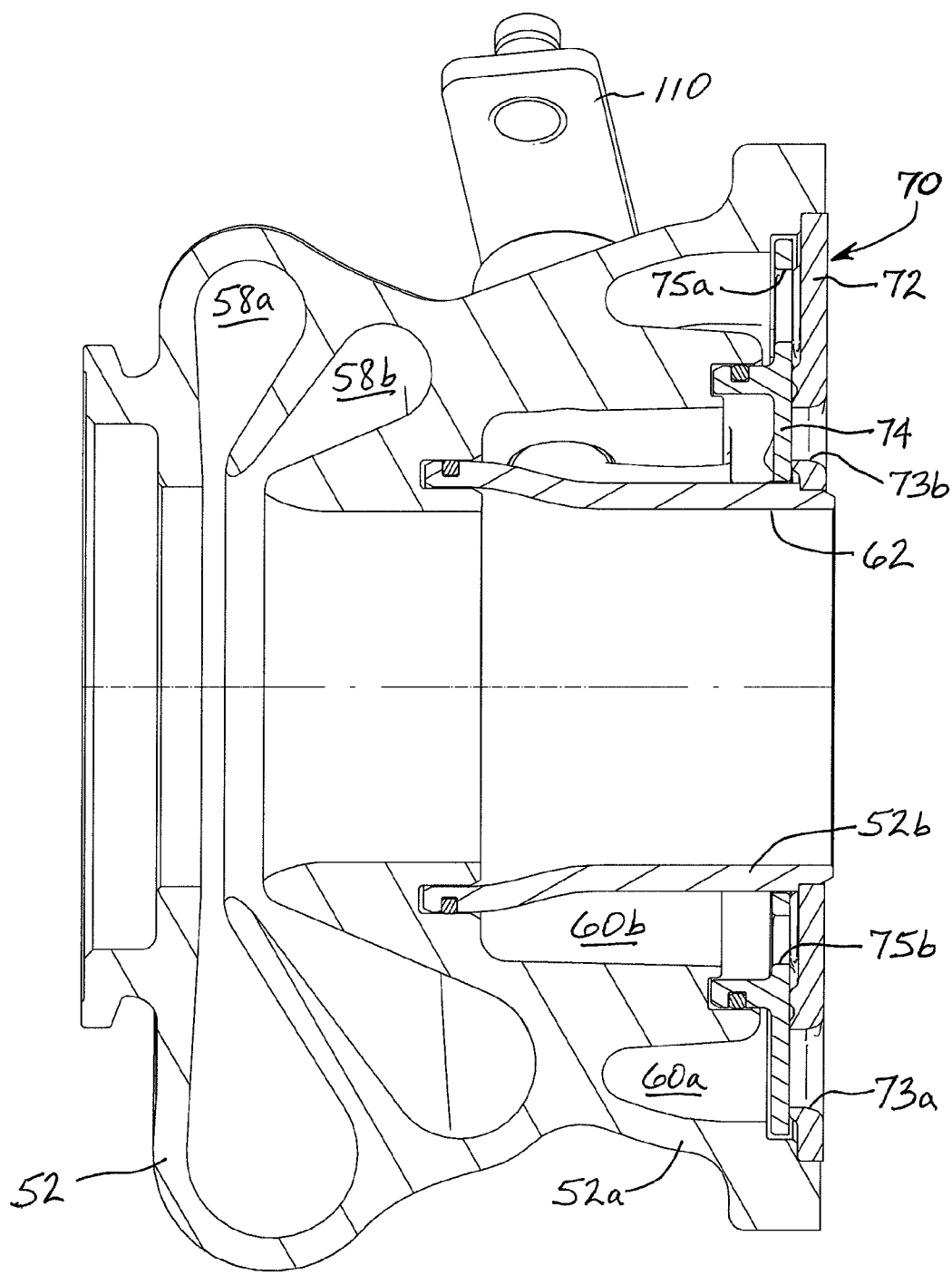
FIG. 4 is an axial cross-sectional view of the turbine assembly of FIG. 1 on a first axial plane.
Figure 5:
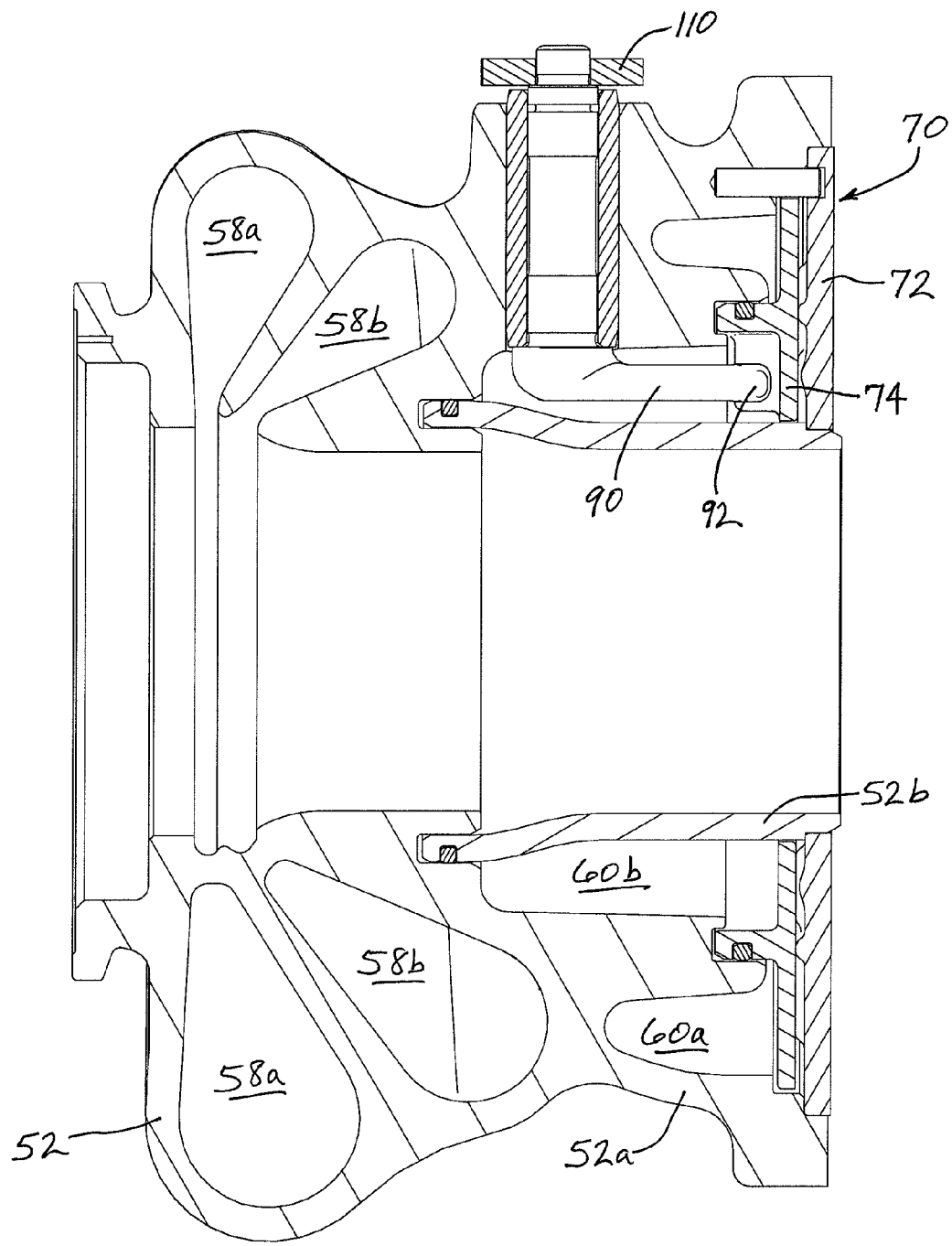
FIG. 5 is an axial cross-sectional view of the turbine assembly of FIG. 1 on a second axial plane.
Figure 6:
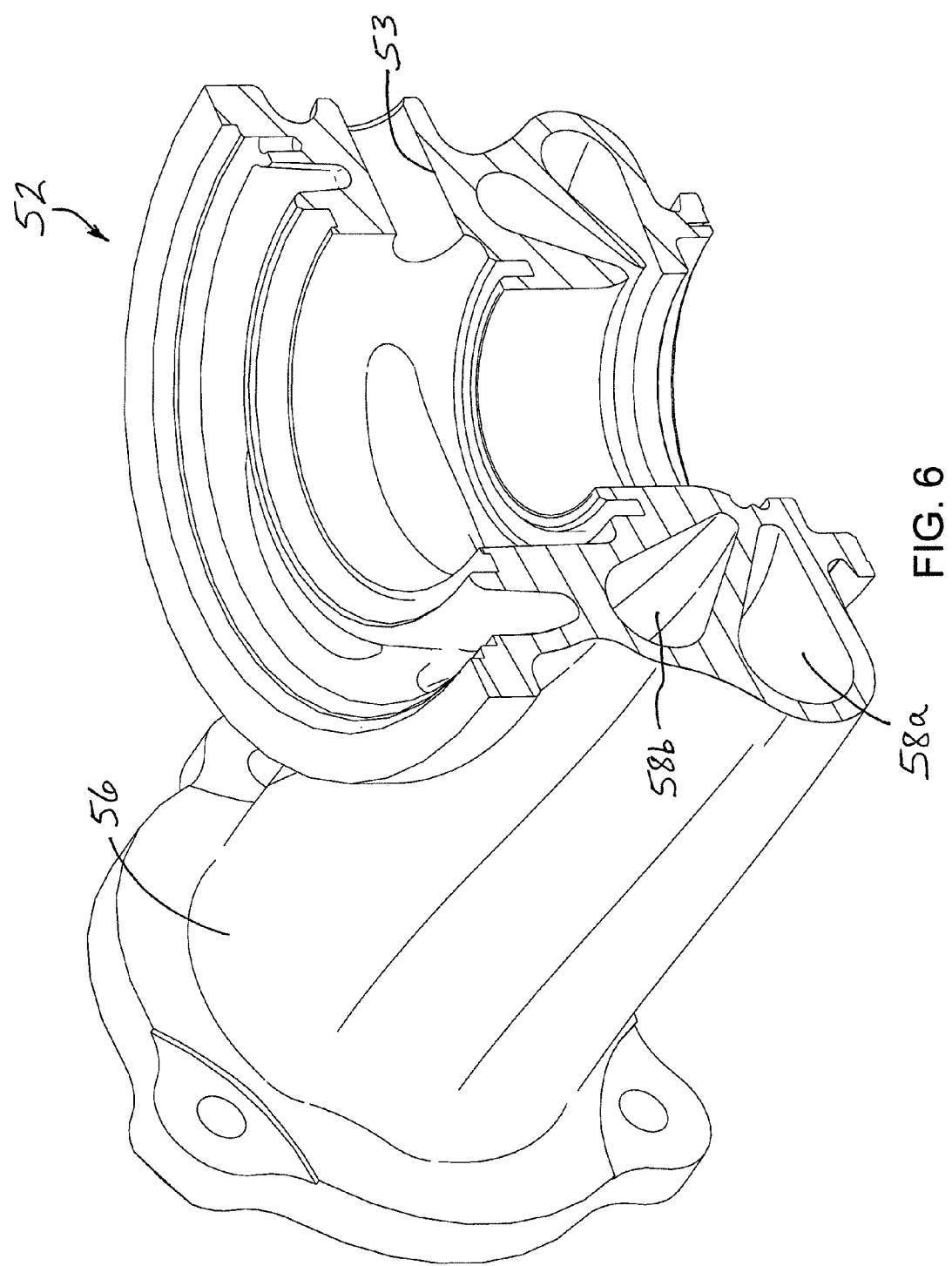
FIG. 6 is an axially sectioned perspective view of the turbine housing for the turbocharger of FIG. 1.
Figure 7:
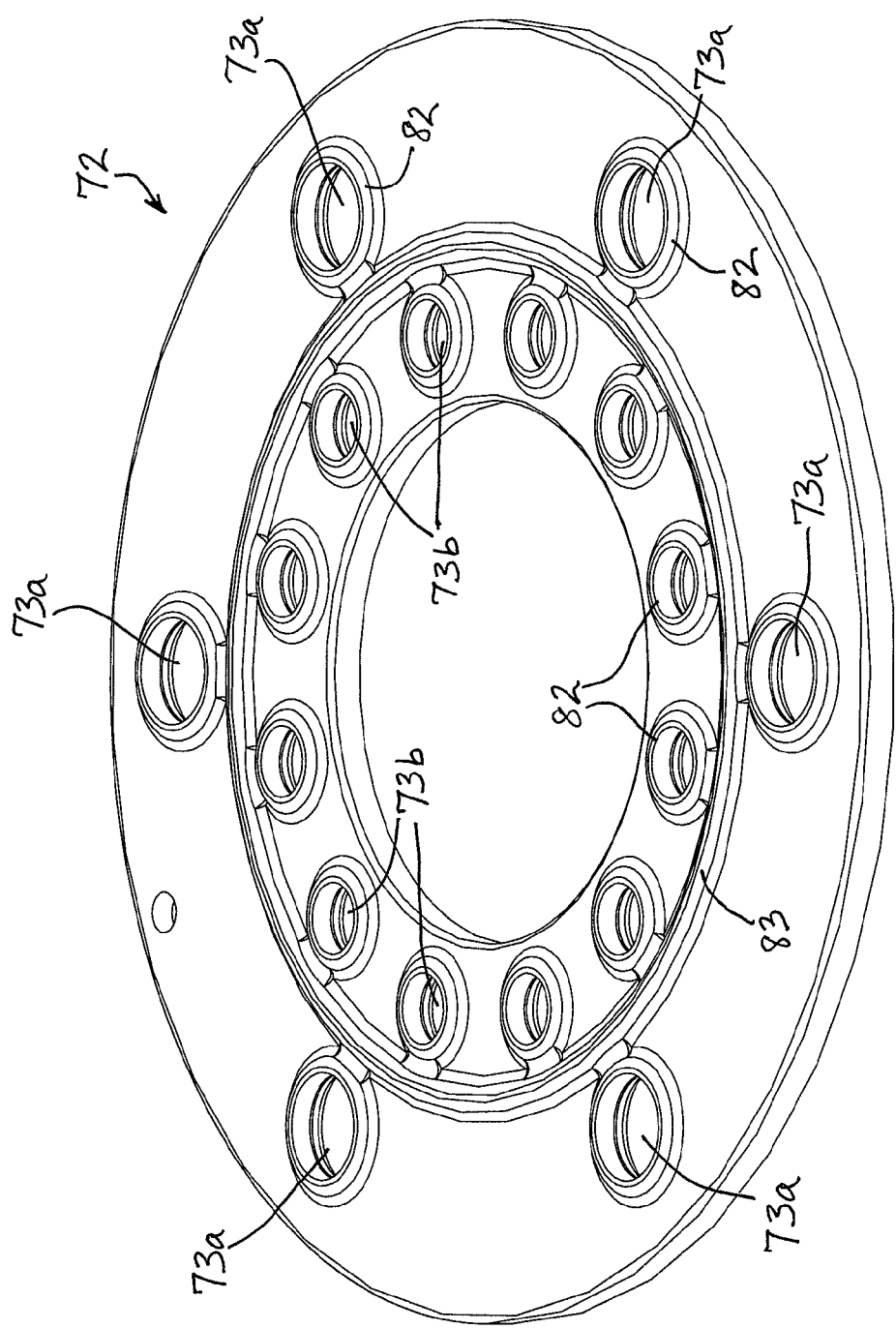
FIG. 7 is a perspective view of the valve seat for the annular bypass valve of the turbocharger of FIG. 1.
Figure 8:
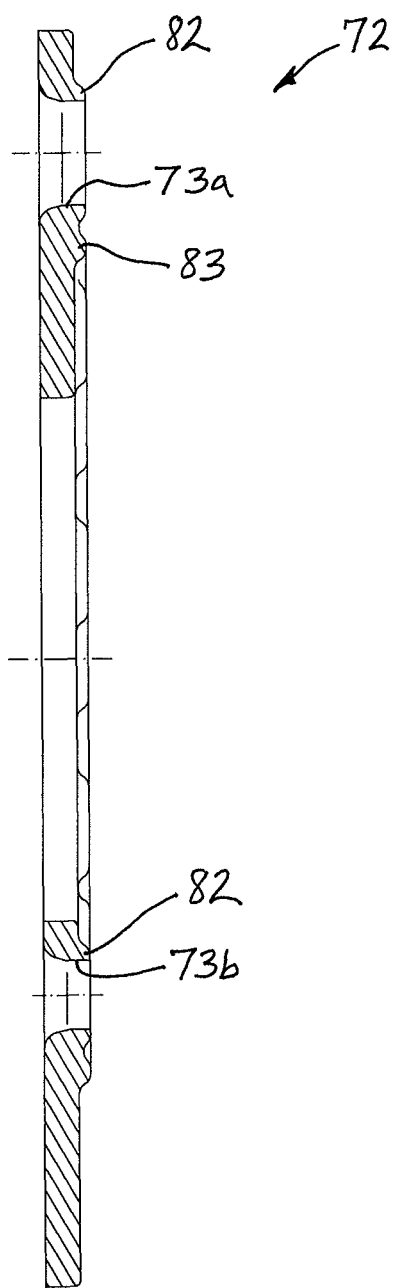
FIG. 8 is an axial cross-sectional view of the valve seat of FIG. 7.
Figure 9:
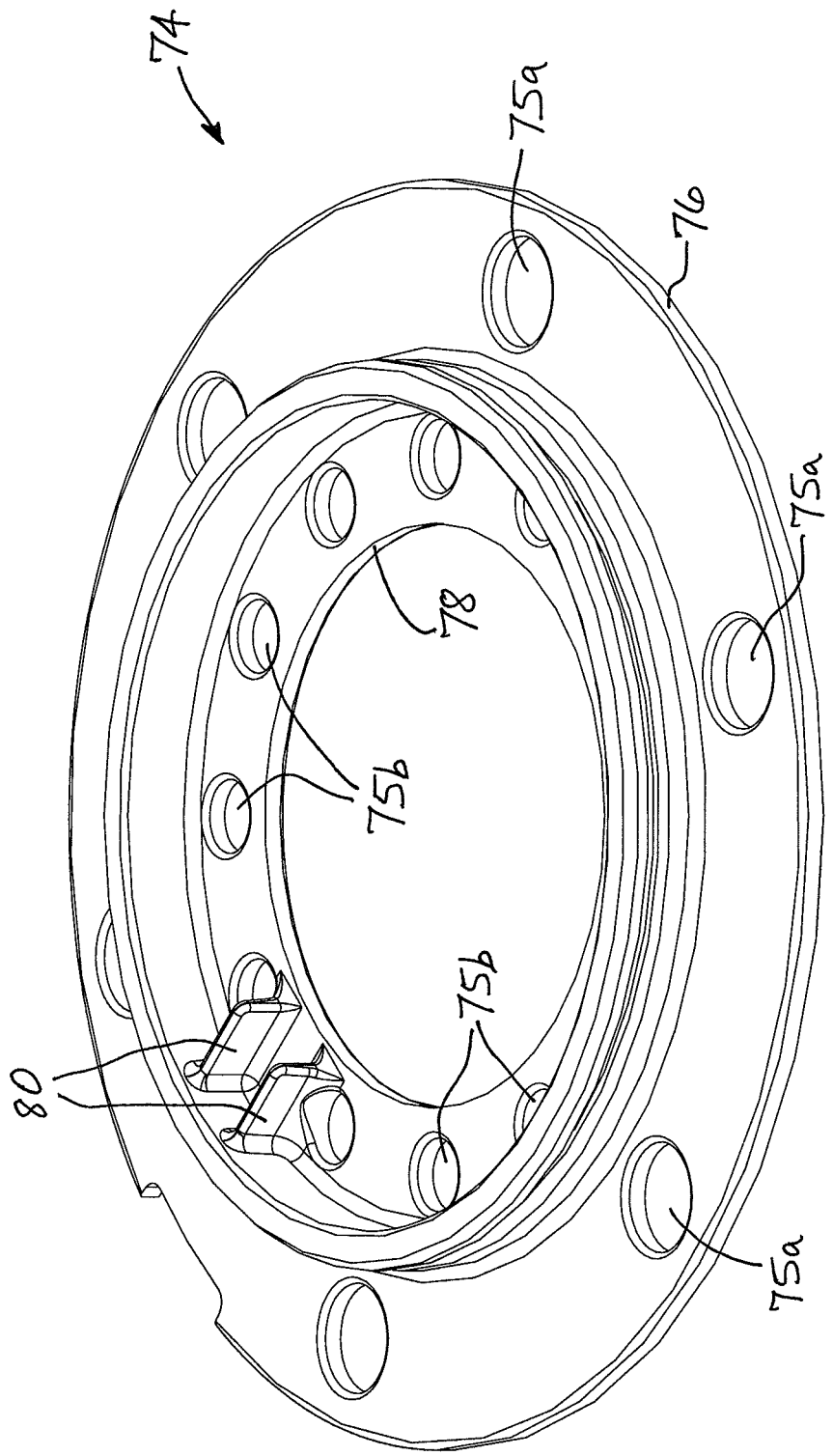
FIG. 9 is a perspective view of the rotary valve member for the annular bypass valve of the turbocharger of FIG. 1.

With reference particularly to FIGS. 4, 7, and 8, each of the orifices 73a and 73b in the valve seat 72 has a raised pad 82 surrounding it. The pads 82 abut the planar face of the valve member 74 (FIG. 4) and serve as seals to help seal the interface between the valve member and valve seat. The valve seat 72 also defines a ring-shaped raised pad 83 located radially intermediate the orifices 73a and the orifices 73b for sealing against a surface of the valve member so as to minimize or eliminate leakage flow between the outer and inner bypass streams in the bypass passages 60a and 60b. The provision of the raised pads 82, 82 reduces the total surface area of the valve seat 72 in frictional contact with the rotary valve member 74, thereby reducing the total friction forces that the actuation system must overcome to rotate the valve member.

Figure 10:
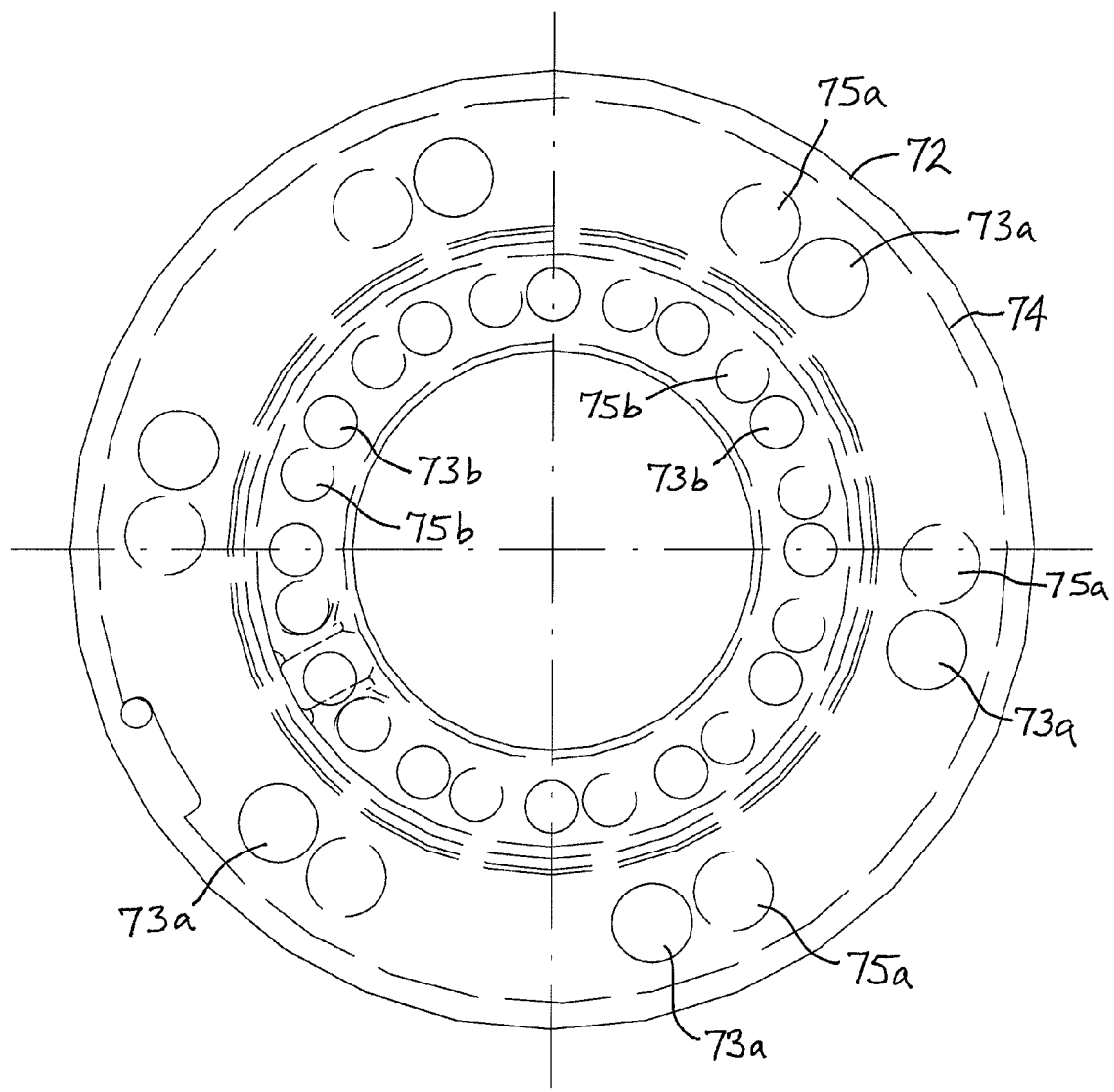
FIG. 10 is an axial view of the annular bypass valve, as viewed from a position downstream of the valve looking axially upstream, showing the valve in a closed position.

FIGS. 10-13 illustrate the various positions of the bypass valve 70 for regulating bypass flow. In FIG. 10, the valve member 74 is positioned such that each of its orifices 75a is located between two adjacent orifices 73a in the valve seat 72, and each orifice 75b is located between two adjacent orifices 73b, and there is sufficient circumferential distance between adjacent orifices 73a, b to accommodate an orifice 75a, b with no overlap therebetween. Thus, the position of FIG. 10 represents a closed position of the bypass valve in which essentially no exhaust gas can pass through the bypass passages 60a and 60b (except perhaps for a very small leakage flow of no appreciable consequence).

Figure 11:
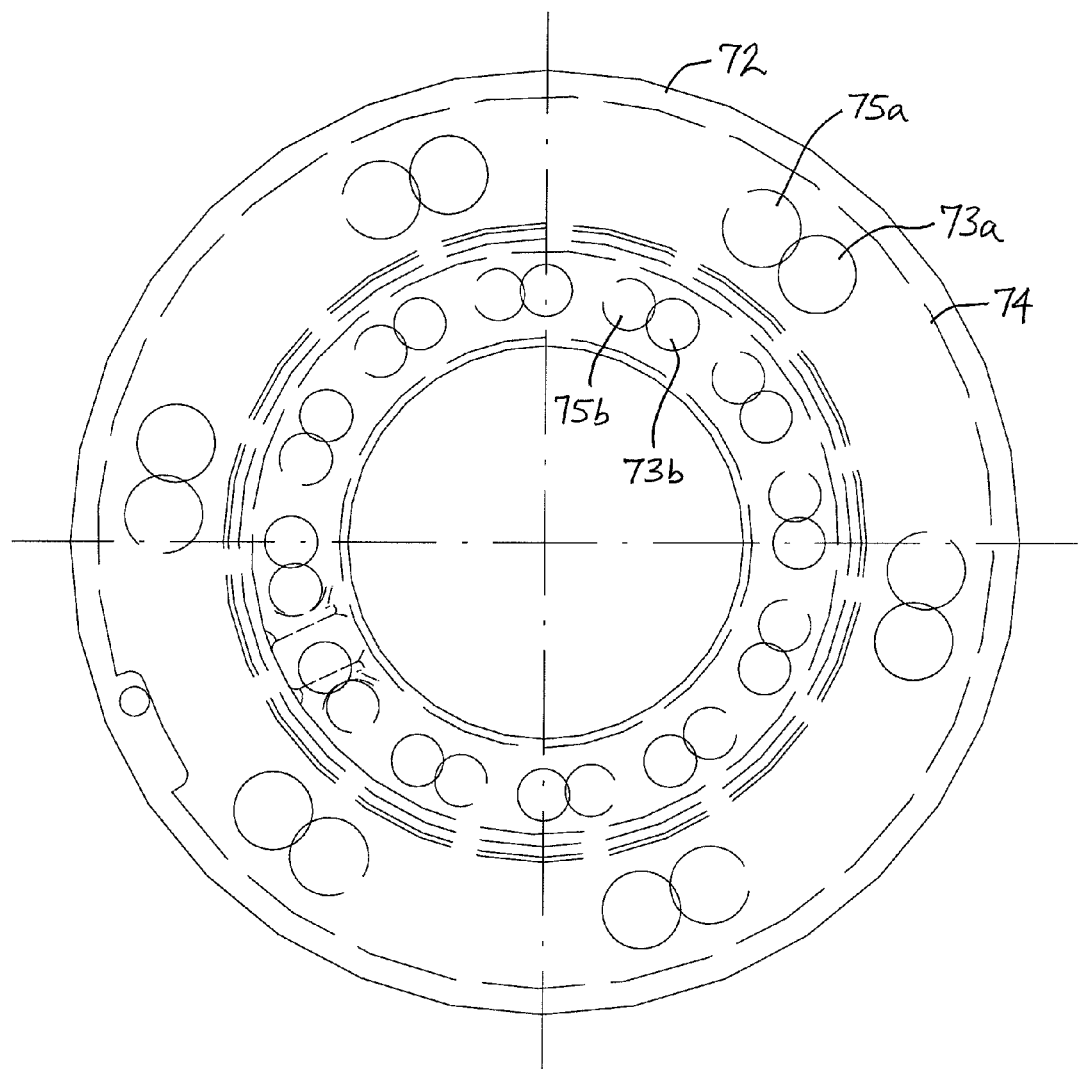
FIG. 11 is a view similar to FIG. 10, showing the valve when it has just been cracked open by rotation of the rotary valve member.

FIG. 11 shows the valve in a "crack-open" position in which the valve member 74 has been rotated a small amount clockwise relative to FIG. 10 such that there just begins to be some overlap between the orifices 75a and the orifices 73a and between the orifices 75b and the orifices 73b.

Figure 12:
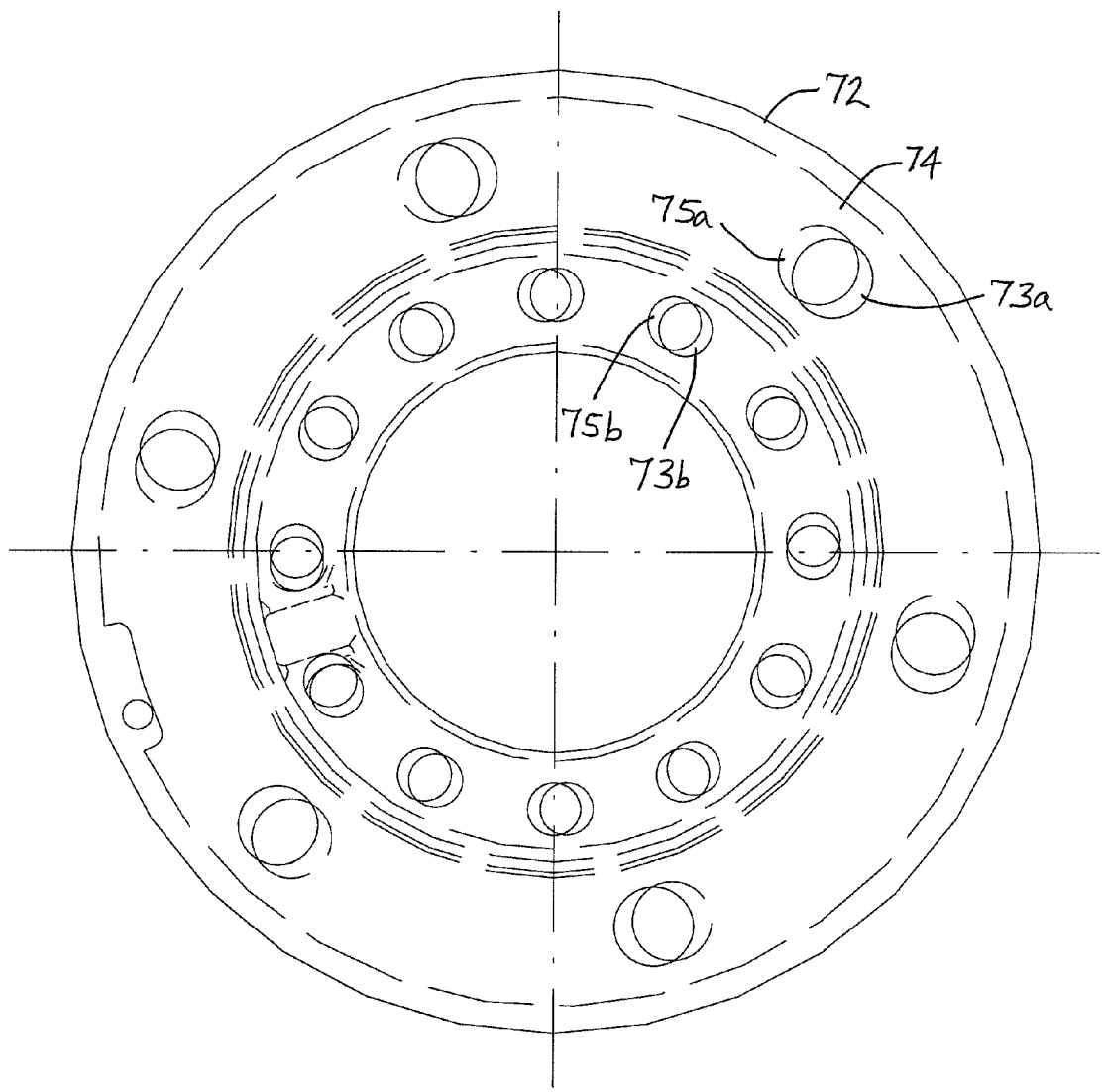
FIG. 12 is a view similar to FIG. 10, showing the valve in a partially open position after further rotation of the valve member.

With further clockwise rotation of the valve member 74 from the position of FIG. 11, a greater degree of overlap exists between the orifices 75a and 73a and between the orifices 75b and the orifices 73b, as shown in the "partially open" position of FIG. 12.

Figure 13:
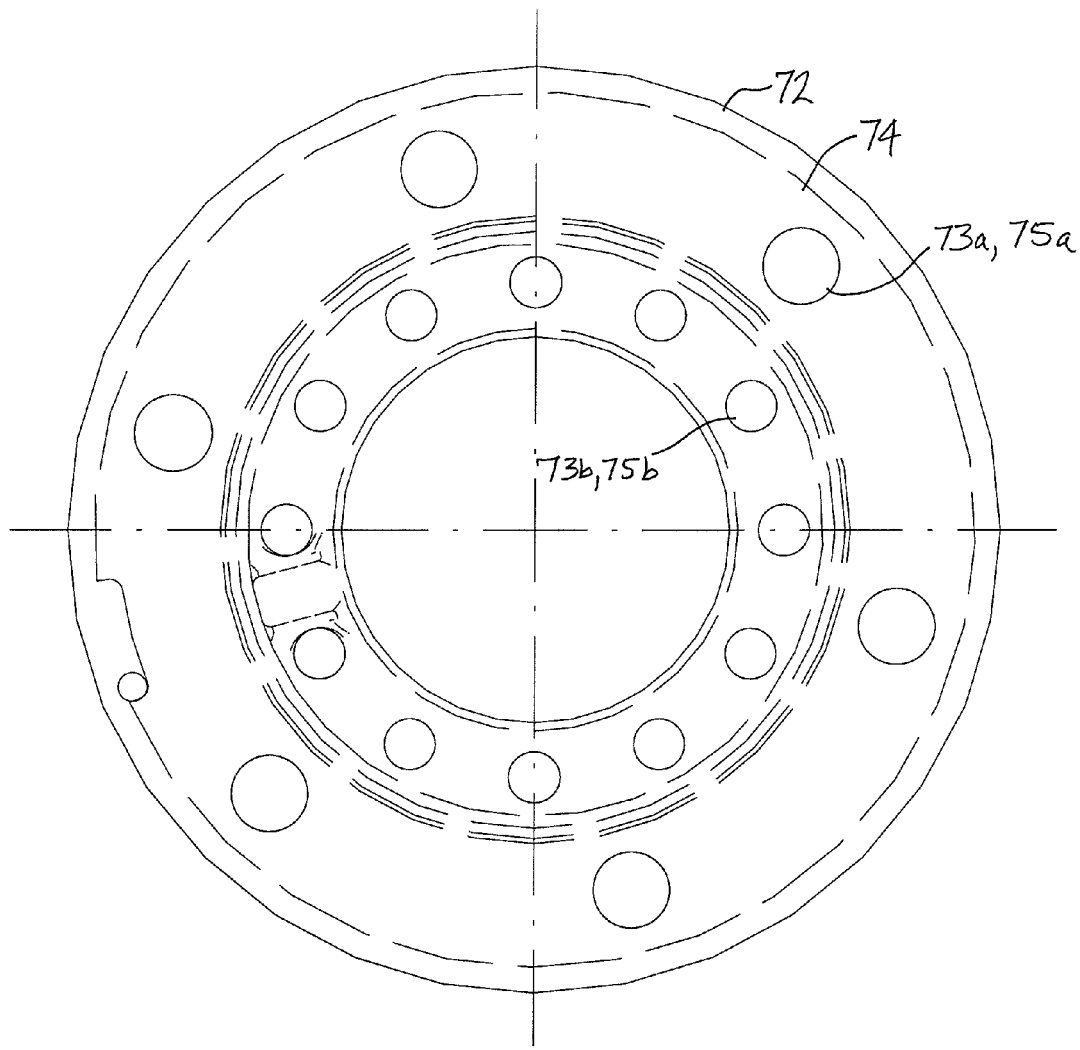
FIG. 13 is a view similar to FIG. 10, showing the valve in a fully open position after further rotation of the valve member.

FIG. 13 shows a fully open position of the valve, in which the maximum possible overlap exists between the orifices 75a and 73a and between the orifices 75b and the orifices 73b.

With the described annular bypass valve 70, exhaust gas pressure acts on the valve member 74 in a direction toward the fixed valve seat 72, thereby tending to improve sealing between the valve member and valve seat. Furthermore, the gas pressure does not tend to open the valve, in contrast to the aforementioned swing and poppet style bypass valve arrangements in which gas pressure acts in a direction tending to open the valve and cause leakage. The improved sealing made possible by the valve 70 is thought to be significant because it can improve the transient response time of the turbocharger, by making better use of instantaneous engine pulses in the exhaust gas stream, especially at low engine speeds and gas flow rates where the pulse impact is most significant in regard to turbine efficiency.

A further advantage is that the valve 70 can achieve better controllability than is typically possible with swing or poppet valves, particularly at the crack-open point. In particular, the evolution of the shape and size of the flow passages through the valve as the valve member 74 is rotated can be tailored to the needs of a particular application simply by suitably configuring the sizes, angular locations (e.g., whether uniformly or non-uniformly spaced apart), and shapes of the orifices in the valve member and valve seat. Thus, while the orifices 73, 75 are shown as being circular in the drawings, alternatively they can be made non-circular as a way of altering the evolution of the flow passages as the valve opens. For example, the orifices could be made generally rectangular with their edges extending generally radially (possibly with a larger dimension in the radial direction than in the circumferential direction), which would result in a greater change in flow passage size per degree of valve member rotation, in comparison with the circular orifice shape.

As another example of the fine-tuning of the evolution of the valve flow passages made possible by the invention, the valve seat orifices 73 could have a first circumferential spacing (e.g., uniform) about the circumference, and the valve member orifices 75 could have a second circumferential spacing (e.g., non-uniform) different from the first circumferential spacing. It is further possible (though not essential) in such an embodiment for the orifices 73, 75 to be of different sizes and/or shapes. This could result in, for example, one flow passage (or some other subset of the total number of flow passages) beginning to open before any of the other flow passages begin to open, thereby achieving a very gradual cracking open of the bypass valve. Further rotation of the valve member 74 would then cause the other flow passages to open (perhaps in a sequential or staged fashion, e.g., one flow passage opening at a time until finally all flow passages are open). These are merely some examples of the many different ways the orifices can be configured so as to achieve a desired flow passage evolution as a function of valve member rotation.

As noted, if desired or necessary in a particular application, surfaces of components that relatively slide over one another can be coated with a friction/wear coating that reduces wear of the surfaces. For example, the raised pads 82, 83 and/or the surface of the valve member 74 that the pads contact can be coated. Other surfaces that can be coated include the end of the L-shaped drive arm 90 and/or the surfaces of the valve member 74 contacted by the end of the drive arm. The radially inner and/or outer surfaces of the valve member 74 and/or the confronting surfaces of the turbine housing portions 52a, 52b can be coated with the wear coating. The wear coating can be formed of various materials, including an aluminum diffusion coating, a nickel boron coating, a ceramic coating (e.g., silicon nitride). In order to avoid material transfer from one surface to an abutting surface, preferably the two surfaces are coated with different materials.

Figure 14:
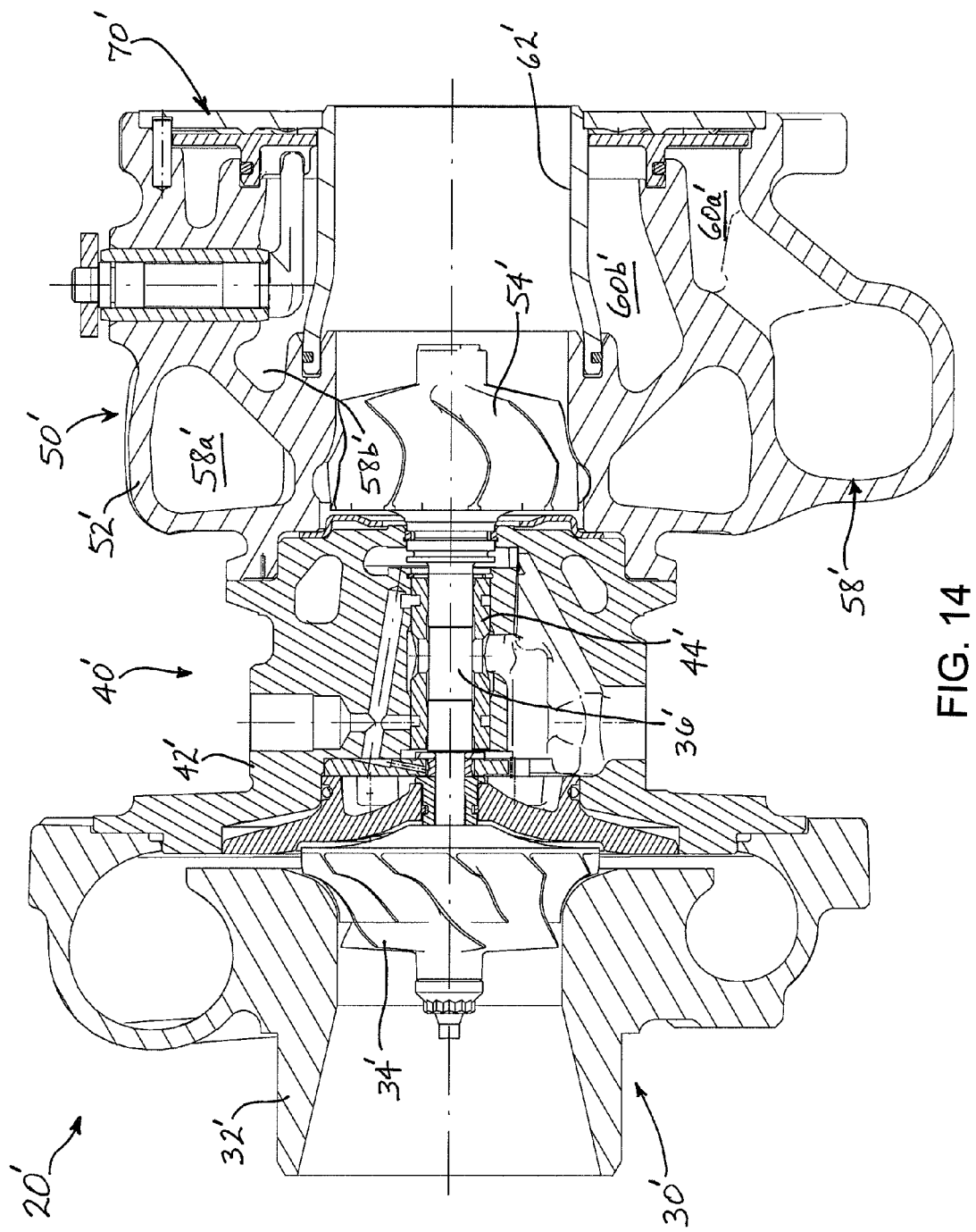
FIG. 14 is an axial cross-sectional view of a turbocharger in accordance with another embodiment of the present invention.
Figure 15:
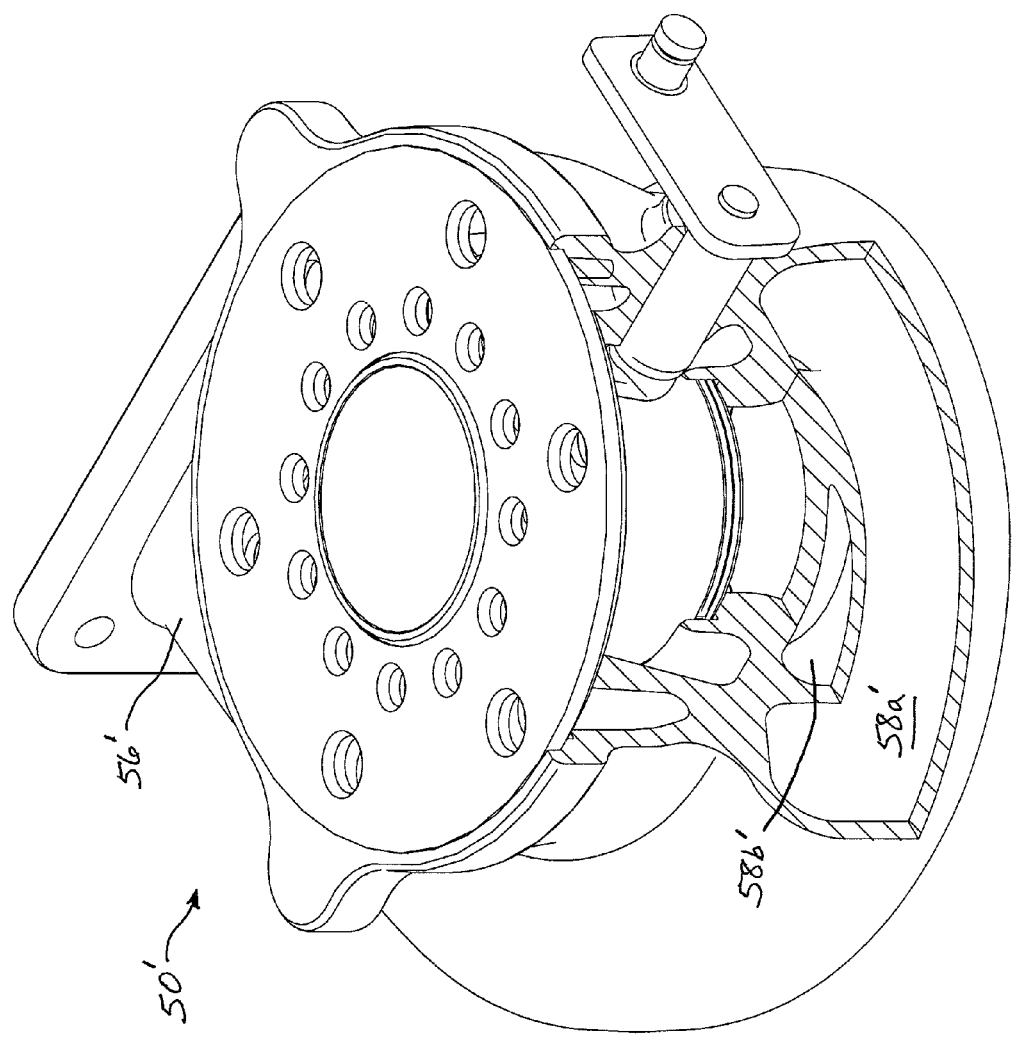
FIG. 15 is a perspective view of the turbine assembly for the turbocharger of FIG. 14, wherein the turbine housing is shown partly cut away to reveal internal details.
Figure 16:
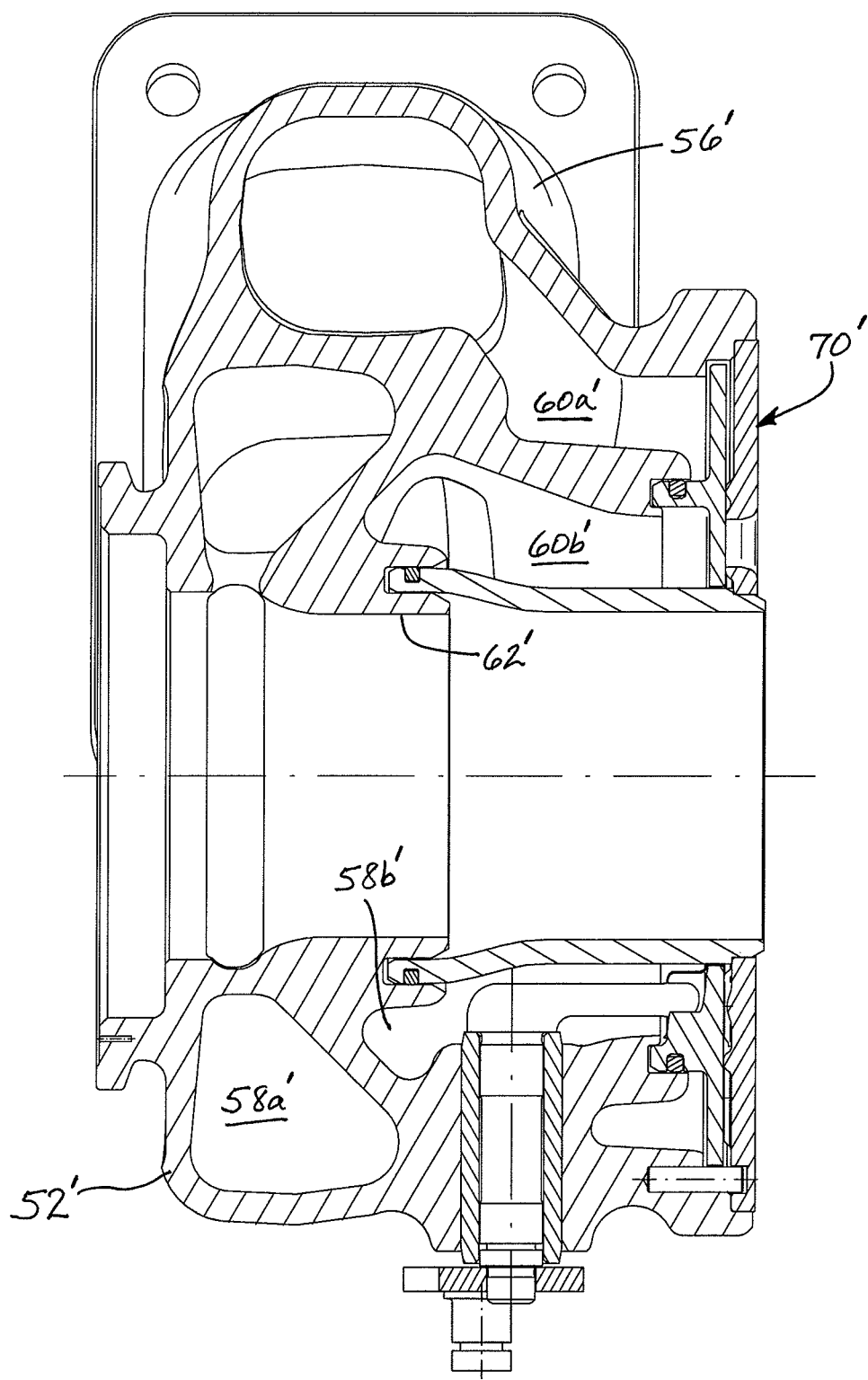
FIG. 16 is an axial cross-sectional view of the turbine housing for the turbocharger of FIG. 14.
Figure 17:
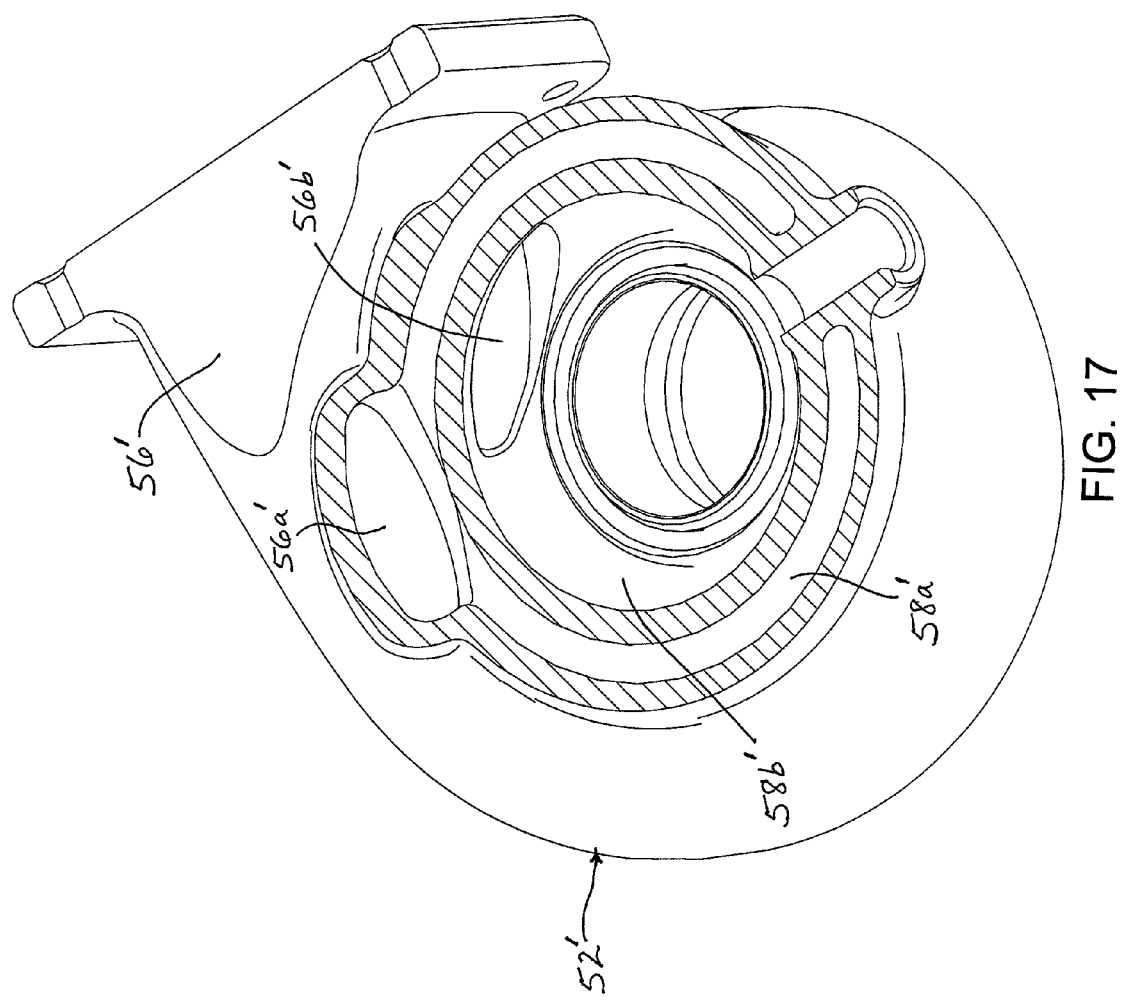
FIG. 17 is a perspective view of the turbine housing of FIG. 16, shown partly in section.

The present invention is not limited to turbochargers with meridionally divided turbine housings such as the embodiment illustrated in FIGS. 1-6 and described above. The invention can also be applied to turbochargers having a sector-divided turbine housing such as shown in FIGS. 14-17. As shown in FIG. 14, major sub-assemblies of the turbocharger 20' include a compressor assembly 30', a center housing assembly 40', and a turbine assembly 50'. The compressor assembly 30' includes a compressor housing 32' and a compressor wheel 34' mounted therein and attached to one end of a rotary shaft 36'. The center housing assembly 40 includes a center housing 42' that is affixed to the compressor housing 32' and that contains bearings 44' for the rotary shaft 36'. The turbine assembly 50' includes a turbine housing 52' and a turbine wheel 54' mounted therein and attached to the opposite end of the rotary shaft 36'.

The turbine housing 52' defines an exhaust gas inlet 56' through which exhaust gas from an internal combustion engine is received, and a sector-divided volute 58' that receives the exhaust gas from the inlet 56' and distributes the gas around the volute for feeding into the turbine wheel 54'. In particular, the sector-divided volute 58' defines a first volute sector 58a' and a separate second volute sector 58b' each of which extends approximately 180° about the longitudinal axis of the turbine. The volute sectors 58a' and 58b' (hereinafter referred to simply as "volutes 58a' and 58b'") collectively extend about 360° about the axis. The volutes 58a' and 58b' respectively receive two separate streams of exhaust gas from the engine (e.g., one stream from one sub-group of engine cylinders and the other stream from another sub-group of engine cylinders). Correspondingly, the exhaust gas inlet 56' is a divided inlet that defines two separate inlets 56a' and 56b' (FIG. 17) that are connected respectively to the two volutes 58a' and 58b'.

The two gas inlets of the divided inlet 56' are also open to two separate generally annular bypass passages 60a' and 60b' defined in the turbine housing 52'. The bypass passages 60a' and 60b' are concentrically arranged (outer passage 60a' being radially outward of inner passage 60b') and both surround an axial bore 62' defined in the turbine housing. Exhaust gas that has passed through the turbine wheel 54' is exhausted from the turbine housing through the bore 62'. The bypass passages 60a' and 60b' provide an alternative pathway for exhaust gas to flow without first having to pass through the turbine wheel 54'.

An annular bypass valve 70' is installed in the bypass passage 60' for regulating flow through the bypass passage. The bypass valve 70' is a divided bypass valve identical or substantially identical to the bypass valve 70 described previously, such that its description will not be repeated here.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
   a compressor wheel mounted within a compressor housing;
   a turbine wheel mounted within a turbine housing and connected to the compressor wheel by a shaft;
   the turbine housing defining an exhaust gas inlet connected to a volute that surrounds the turbine wheel, the turbine housing further defining an axial bore through which exhaust gas that has passed through the turbine wheel is discharged from the turbine housing, the volute comprising a divided volute that defines two separate spaces respectively receiving two separate streams of exhaust gas from an internal combustion engine;
   the turbine housing defining a pair of concentrically arranged outer and inner annular bypass passages surrounding the bore and arranged to allow exhaust gas in the two separate spaces of the volute to bypass the turbine wheel as two separate bypass streams, the outer bypass passage concentrically surrounding the inner bypass passage; and
   an annular bypass valve in fluid communication with the bypass passages, the bypass valve comprising a fixed annular valve seat and a rotary annular valve member arranged coaxially with the valve seat relative to an axis, the valve member being disposed against the valve seat and being rotatable about the axis, the valve member defining a plurality of outer valve member orifices and a plurality of inner valve member orifices therethrough, the valve seat defining a plurality of outer valve seat orifices and a plurality of inner valve seat orifices therethrough, each outer valve member orifice having a corresponding outer valve seat orifice, and each inner valve member orifice having a corresponding inner valve seat orifice, wherein the outer valve member and valve seat orifices are in fluid communication with the outer bypass passage and the inner valve member and valve seat orifices are in fluid communication with the inner bypass passage, rotation of the valve member about the axis selectively varying a degree of alignment between respective orifices defined through each of the valve seat and valve member, ranging from no alignment defining a closed condition of the bypass valve, to at least partial alignment defining an open condition of the bypass valve.

2. The turbocharger of claim 1, wherein the valve member is a generally flat annular disk having the outer and inner valve member orifices circumferentially spaced apart about a circumference of the valve member, and the valve seat is a generally flat annular disk having the outer and inner valve seat orifices circumferentially spaced apart about a circumference of the valve seat, there being sufficient circumferential distance between adjacent outer valve seat orifices to accommodate the outer valve member orifices therebetween in the closed condition of the bypass valve, and there being sufficient circumferential distance between adjacent inner valve seat orifices to accommodate the inner valve member orifices therebetween in the closed condition of the bypass valve.

3. The turbocharger of claim 2, wherein one of the valve member and the valve seat includes raised pads surrounding the respective orifices therein, the pads being in contact with a substantially planar surface of the other of the valve member and the valve seat so as to provide sealing between the valve member and the valve seat.

4. The turbocharger of claim 2, wherein one of the valve member and the valve seat includes a generally ring-shaped raised pad located radially intermediate the outer and inner orifices for sealing against a surface of the other of the valve member and the valve seat so as to minimize or eliminate leakage flow between the outer and inner bypass streams.

5. The turbocharger of claim 2, wherein the ring-shaped raised pad is provided on the valve seat.

6. The turbocharger of claim 2, wherein at least one of the raised pads and the planar surface contacted by the raised pads includes a surface wear coating that reduces wear caused by relative sliding contact between the raised pads and the planar surface.

7. The turbocharger of claim 1, wherein the volute of the turbine housing is sector-divided such that the two separate spaces each occupies approximately 180° in the circumferential direction.

8. The turbocharger of claim 1, wherein the volute of the turbine housing is meridionally divided such that the two separate spaces each occupies approximately 360° in the circumferential direction.

9. The turbocharger of claim 1, further comprising a rotary drive member penetrating through the turbine housing in a direction generally transverse to the axis about which the valve member rotates, and a drive arm attached to a distal end of the rotary drive member, a distal end of the drive arm engaging the valve member such that rotation of the rotary drive member causes the drive arm to rotate the valve member about the axis.

10. The turbocharger of claim 9, further comprising a link attached to a proximal end of the rotary drive member, and an actuator having an actuator rod, the actuator being operable to extend and retract the actuator rod, a distal end of the actuator rod being connected to the link such that extension of the actuator rod causes the link to rotate the rotary drive member in one direction and retraction of the actuator rod causes the link to rotate the rotary drive member in the opposite direction.

* * * * *